United States Patent [19]
Murakami

[11] Patent Number: 5,754,425
[45] Date of Patent: May 19, 1998

[54] DIGITAL CONTROL METHOD AND APPARATUS FOR ROTARY MEMBER SUPPORTED BY MAGNETIC BEARING

[75] Inventor: Chikara Murakami, Tokyo, Japan

[73] Assignee: Ebara Corporation, Tokyo, Japan

[21] Appl. No.: 518,139

[22] Filed: Aug. 22, 1995

[30] Foreign Application Priority Data

Aug. 22, 1994 [JP] Japan ................................. 6-219550
Jul. 21, 1995 [JP] Japan ................................. 7-207820

[51] Int. Cl.$^6$ ........................................................ H02K 7/09
[52] U.S. Cl. .................... 364/160; 310/40 R; 310/90; 310/90.5; 324/207.11; 324/207.12
[58] Field of Search ........................ 364/160, 174; 310/40 R, 90, 90.5, 10; 324/200, 207.11, 207.12; 417/410.1, 353

[56] References Cited

U.S. PATENT DOCUMENTS

| | | | |
|---|---|---|---|
| 4,018,087 | 4/1977 | Wenz | 73/146 |
| 4,294,493 | 10/1981 | Sindlinger et al. | 310/90.5 |
| 4,340,260 | 7/1982 | Forster et al. | 310/90.5 |
| 4,885,491 | 12/1989 | Hiyama et al. | 310/90.5 |
| 5,008,763 | 4/1991 | Horino | 360/70 |
| 5,189,913 | 3/1993 | Netzer | 73/504.08 |
| 5,247,219 | 9/1993 | Nakagawa et al. | 310/90.5 |
| 5,576,587 | 11/1996 | Takahashi et al. | 310/90.5 |

OTHER PUBLICATIONS

Japan Aeronautocs and Space Science Society's Transactions, vol. 41; No. 476, Sep. 1993.

Primary Examiner—Ellis B. Ramirez
Assistant Examiner—Demetra R. Smith
Attorney, Agent, or Firm—Armstrong, Westerman, Hattori, McLeland, & Naughton

[57] ABSTRACT

A method of controlling the axis S of a rotary member 1 is disclosed which comprises the steps of: (a) sampling an inclined angle $\theta$ and it's rate $d\theta/dt$ of the rotary member; (b) in response to the angle $\theta$ and rate $d\theta/dt$, analytically determining an assumed inclined angle motion of the rotary member at the end of each sampling period T when no control torque is applied to the axis during the sampling period; (c) dividing the assumed inclined angle motion into low and high frequency mode components; (d) determining rotational vectors $\underline{Sp}$ and $\underline{Sn}$ of the mode components in a free-conical motion; (e) determining rotational vectors of the divided mode components in a forced conical motion at the end of the sampling period, provided that an unknown constant control torque $\underline{u}(k)$ is virtually applied to the axis during one sampling period, but no free conical motion exists; (f) adding the rotational vectors in the free and forced conical motions for each of mode components; (g) determining the direction and magnitude of the unknown control torque $\underline{u}(k)$ for each of mode components so as to reduce the rotational vectors of the free conical motion; and (h) applying each of the determined control torques or the added control torque to the axis by control coils.

14 Claims, 11 Drawing Sheets

DIGITAL CONTROL METHOD AND APPARATUS FOR ROTARY MEMBER SUPPORTED BY MAGNETIC BEARING

BACKGROUND OF THE INVENTION

1. Field of the Invention

The present invention relates to a digital control method and apparatus for a rotary member supported by magnetic bearings used for a high speed rotor or the like.

2. Prior Art

A rotary axis of a rotary member supported by magnetic bearings is generally accompanied by a whirling phenomenon around the center of gravity. This whirling comprises two components, or low and high frequency components of a rigid mode. The former is called as precession mode while the latter is called as nutation mode. There is also available a flexible or elastic mode other than the rigid mode.

For controlling an inclined angle θ of the rotary axis, it is essential to suppress the above mentioned two components of the rigid mode. Normally, the inclined angle θ is detected by an attitude sensor, while an angular velocity of inclination is detected by the use of a special sensor or it is assumed from the information on the inclined angle θ by means of an estimation circuit or an estimation software which is called as an observer. The present invention is based on the assumption that the inclined angle θ and it's rate or the inclined angular velocity dθ/dt may be obtained by a certain conventional method, and relates to how to determine a control torque for feedback from the inclined angle and it's rate.

It has hithertofore been a main tendency that the dθ/dt signal is obtained by using a Z-transform of the pseudo differentiation or the observer in a digital control system without use of a special sensor due to a cost and a mounting space available. However, the observer is a relatively complicated software program and is difficult to be accommodated in a short sampling period.

Although the observer can be accommodated if the sampling period is prolonged, this results in an unstable condition. Therefore only the analog control is utilized in a high speed rotation range, and a digital control is limited to use a low speed rotational range. It is also known that the Z-transform is not suitable in relation to aliasing when the sampling period is long.

Since hardware usable digital controls have been so developed at the present stage, development of software enabling a stable control has been anticipated in the field of magnetic bearings, even if the sampling period is long. The long sampling period provides such advantages that the low frequency characteristics of a power supply may be adequate, thereby reducing cost, while if the sampling period is short, not only a digital signal processing unit operable at a high speed but also a high speed AD/DA converter are required.

SUMMARY OF THE INVENTION

It is an object of the present invention to provide a digital control method and apparatus for a rotary member supported by magnetic bearings, wherein a software for deciding a control torque is included to allow a sufficiently stable control even if a sampling period is longer than a high frequency mode thereof.

In order to solve the above problem, the present invention provides a method of digitally controlling the axis of an axisymmetry rotary member supported by magnetic bearings, comprising the steps of: (a) sampling an inclined angle and it's rate of said rotary member; (b) in response to the sampled inclined angle and it's rate, analytically determining an assumed inclined angle motion of said rotary member at or around the end of each sampling period when no control torque is applied to said axis of said rotary member during the sampling period; (c) dividing said assumed inclined angle motion into a plurality of mode components; (d) determining rotational vectors of the divided mode components in a free conical motion; (e) determining rotational vectors of the divided mode components in a forced conical motion at the end of the sampling period, provided that an unknown control torque having a constant direction and constant magnitude is virtually applied to said axis during one sampling period, but no free conical motion exists; (f) adding said rotational vectors in the free and forced conical motions for each of mode components; (g) determining the direction and magnitude of said unknown control torque for each of mode components so as to reduce the rotational vectors of the free conical motion; and (h) applying each of the determined control torques or the added control torque to said axis by control coils.

The above method according to the present invention is applicable to control the axis of an axisymmetry rotary member supported by magnetic bearings when an inclined angle θ and it's rate dθ/dt of the rotary member are available by any suitable means.

The present invention provides a method of digitally controlling the axis of the rotary member even when the rate dθ/dt of the rotary member is not obtained. That is, the present invention provides a method of digitally controlling an axis of an axisymmetry rotary member supported by magnetic bearings, comprising the steps of: (a) measuring an inclined angle of said rotary member by an inclined angle sensor; (b) filtering an inclined angle signal from said inclined angle sensor by a low pass filter to pass only a low frequency mode component therethrough; (c) sampling said low frequency mode component; (d) compensating the sampled low frequency mode component in phase by geometrically rotating the radius vector of the low frequency mode component by a delayed phase which is caused due to passing through said low pass filter; (e) subtracting the sampled and compensated low frequency mode component from the inclined angle signal to obtain a high frequency mode component, thereby the low and high frequency mode components being in a free conical motion at each sampling time; (f) determining rotational vectors of the low and high frequency mode components in the free conical motion; (g) determining rotational vectors of the low and high frequency mode components in a forced conical motion at the end of the sampling period, provided that an unknown control torque having a constant direction and constant magnitude is virtually applied to said axis during the sampling period, but no free conical motion exists; (h) adding said rotational vectors in the free and forced conical motions for each of the low and high frequency mode components; (i) determining the direction and magnitude of said unknown control torque for each of the low and high frequency mode components so as to reduce the rotational vectors of the free conical motion; and (j) applying each of the determined control torques or the added control torque to said axis by control coils.

The present invention also provides a system for digitally controlling an axis of an axisymmetry rotary member supported by magnetic bearings, comprising: (a) sampling means for sampling an inclined angle and it's rate of said rotary member; (b) means, in response to said inclined angle and it's rate, for analytically determining an assumed inclined angle motion of said rotary member at or around the end of each sampling period when no control torque is applied to said axis of said rotary member during the sampling period; (c) means for dividing said assumed inclined angle motion into a plurality of mode components; (d) means for determining rotational vectors in a free conical motion of the divided mode components; (e) means for determining rotational vectors of the divided mode components in a forced conical motion at the end of the sampling period, provided that an unknown control torque having a constant direction and constant magnitude is virtually applied to said axis during the sampling period, but no free conical motion exists; (f) means for adding said rotational vectors in the free and forced conical motions for each mode component; (g) means for determining the direction and magnitude of said unknown control torque for each of mode components so as to reduce the rotational vectors of the free conical motion; and (h) means for applying each of the determined control torques or the added control torque to said axis by control coils.

The present invention further provides a system of digitally controlling an axis of an axis-symmetry rotary member supported by magnetic bearings, comprising: (a) an angle sensor for measuring an inclined angle of said rotary member; (b) a low pass filter for passing only a low frequency mode component in an inclined angle signal output from said inclined angle sensor; (c) means for sampling said low frequency mode component; (d) means for compensating the sampled low frequency mode component in phase by geometrically rotating the radius vector of the low frequency mode component by a delayed phase which is caused due to passing through said low pass filter; (e) means for subtracting the sampled and compensated low frequency mode component from the sampled inclined angle signal to obtain a high frequency mode component, thereby the low and high frequency mode components being in a free conical motion at each sampling time; (f) means for determining rotational vectors in the free conical motion of the low and high frequency mode components; (g) means for determining rotational vectors in a forced conical motion of low and high frequency mode components at the end of the sampling period, provided that an unknown control torque having a constant direction and constant magnitude is virtually applied to said axis during one sampling period, but no free conical motion exists; (h) means for adding said rotational vectors in the free and forced conical motions for each of the low and high frequency mode components; (i) means for determining the direction and magnitude of said unknown control torque for each of the low and high frequency mode components so as to reduce the rotational vectors of the free conical motion; and (j) control coils for applying each of the determined control torques or the added control torque to said axis.

DETAILED DESCRIPTION OF THE INVENTION

Before explaining an embodiment of the present invention, the principals of the present invention will now be explained by referring to the accompanying drawings.

Rotation of a rotary member is provided by a motor or the like with the principal axis of inertia of the rotary member being selected as an axis of the rotation. When the rotary member is given the rotation force, it is provided with an angular momentum vector which has a direction factor quite close to the principal axis of inertia but not completely coinciding with it. Such non-coincidence as above is the main reason for the nutation mode. Furthermore, since the angular momentum vector is not located at the aimed direction (which is the central axis at a bearing stator side in most cases), this is the main reason of the precession mode resulted from a restoring spring coefficient of a magnetic bearing, relative to an inclined angle.

In the case of the magnetic bearing, the restoring spring coefficient is frequently negative due to bias fluxes. Accordingly, in this case, the precession mode turns forwardly. Conversely, if the restoring spring coefficient is positive, the precession mode turns rearwardly. In the mean time, the nutation mode always turns forwardly.

Figure 1:
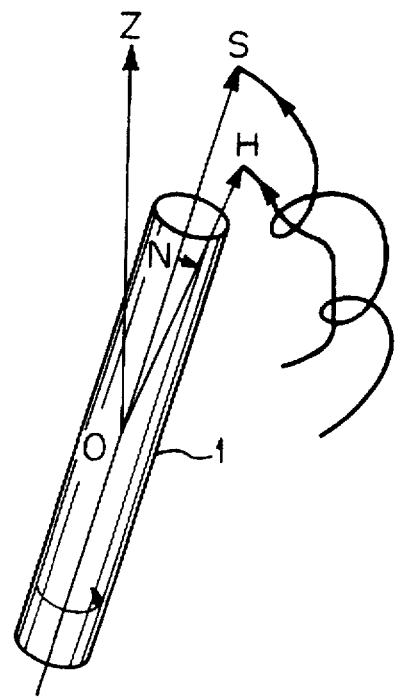
FIG. 1 illustrates manners of the tipping motion and the angular momentum vector motion of a rotary member.
Figure 2:
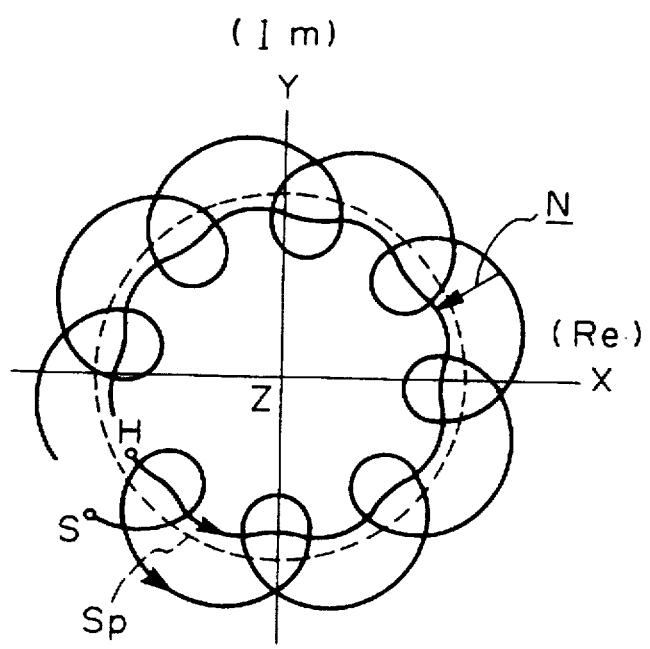
FIG. 2 is a plan view of the manners of precession and nutation modes of the rotary member, as shown in FIG. 1.

FIG. 1 illustrates these manners of the modes, where the restoring spring coefficient is negative. In FIG. 1, the symbol S designates the rotary axis of a rotary member 1 and H an angular momentum vector thereof. FIG. 2 is a plan view of FIG. 1 wherein the angular momentum vector H draws gentle circles in the forward rotation (or leftward rotation). X and Y coordinate axes in FIG. 2 are the inertia coordinate axes (radial axes) at the magnetic bearing stator side and Z coordinate axis which crosses with the X and Y axes is the central axis of the stator. It is the purpose of the intended control to cause the rotary axis S to align with the central axis Z. The rotary axis S follows the angular momentum H by drawing quicker circles in the leftward rotation, as shown in FIG. 2.

It is seen from the foregoing explanation that the locus of the rotary axis S in the free motion which looks complicated at first sight is composed of two frequency components. More specifically, the locus is represented by superimposing the high frequency circular motion with a constant radius at a high speed (or a high frequency) on the low frequency circular motion with a constant radius at a slow speed (or a low frequency) around the central axis Z as shown by the dotted line Sp in FIG. 2, wherein the center of high frequency circular moves along the low frequency circular Sp.

Figure 3:
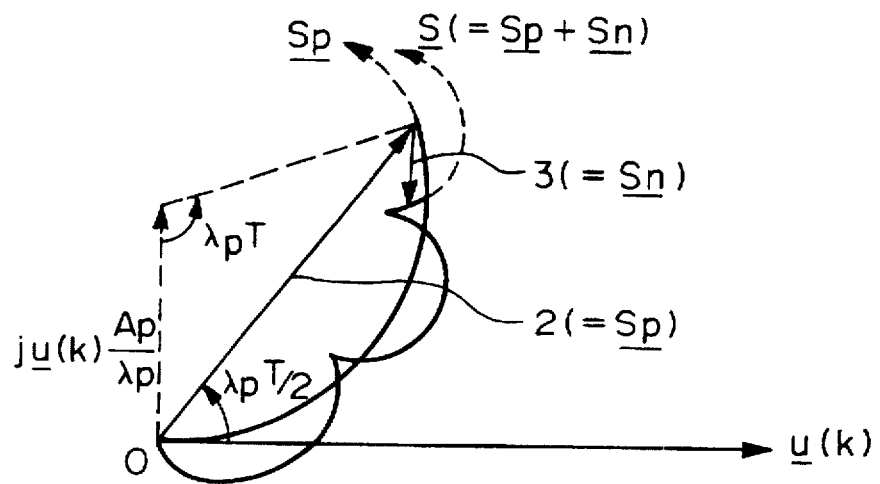
FIG. 3 illustrates vectors caused by applying a torque u(k) having a constant magnitude and constant direction only for one sampling period T to a rotary member which is initially in an ideal spin condition without any whirling.

It is assumed that the rotary member in the spinning condition which does not have such a whirling as above, which is the ideal spinning condition, is applied with a torque u(k) having a constant magnitude and a constant direction from control coils during only one sampling period T. Initially, as shown in FIG. 3, a quick (high frequency) rotary motion Sn is imposed on a simple low frequency circular motion Sp in tangent with the torque u(k) at the center so that the total motion S draws an epicycloid curve. It should be noted that underlined symbols in the specification imply complex vectors.

In FIG. 3, the case where the sampling period is about two and half times the high frequency mode period is illustrated. The effective portion of the low frequency mode at the time of termination of the control torque is represented by the straight line (or chord) 2 connecting the origin O and the end of the arc curve Sp. The small chord 3 connecting the tip end of the chord 2 with end of the motion S represents the effective portion of the high frequency mode. These straight lines or chords 2 and 3 will be the rotary vectors of a free conical motion after the torque application is finished.

The effect of the torque u(k) is such that the above-mentioned rotary vectors are simply added to those of the free motion of the rotary member 1 with no torque at the end of the assumed or estimated torque u(k) in accordance with the principle of superposition as the forced motion, and it results in a free motion obtained after a constant torque has been applied to the rotary member in a free motion condition for a given period of time. Accordingly, it is only necessary to determine the directions of the straight lines (or vectors) 2 and 3 and the relevant torque u(k) so that the addition results in the reduction of both modes. In other words, it is only necessary to select the direction of the torque u(k) in such a manner that the radius of two circular motions of the high and low frequency modes as described above is offset by these vectors 2 and 3.

The method of selecting the direction of the torque u(k) will next be described in detail. Assuming that the angular frequencies (or velocities) of the high and low frequency modes are respectively λn and λp, the vector 2 effective for offsetting the low frequency mode is advanced by λp T/2 relative to the torque u(k) as is clear from FIG. 3. On the other hand, in the high frequency mode, the vector 3 can be shown in FIG. 4 when it is drawn without being superimposed on the low frequency mode. The angular relation relative to the torque u(k) is similar to that in the low frequency mode, though λn is put in place of λp and the direction is opposite to the former case. It is to be noted that although in FIGS. 3 and 4 substantially the same angles are drawn, the high frequency mode has, in reality, larger angle than that of the low frequency mode by a few times or even by one digit. The radius of circles drawn in FIGS. 3 and 4 will be explained later.

It is to be noted that the suppression of both modes is not necessarily aligned with the direction of the torque u(k), which has, however, not caused any problems. In some rare cases, the suppression of both mode may act in opposite directions. In those cases, no control may be provided due to their offsetting with each other. Nevertheless, this system is not an unstable system owing to the gyroscopic effect even if the spring coefficient relative to the inclined angle is negative, and the condition changes with the lapse of time and two modes will be finally converged, thereby not resulting in diversion. Care has to be taken, however, that divergence may be caused if a feedback gain will be made too large.

A further physical explanation will be continued so that the mathematical explanation may be better understood. It is assumed that the angular difference between the angular momentum vector H and the rotary axis S is N which is called "Nutation Angle". Feedback is not executed to make the angular difference N zero immediately in order to suppress the high frequency mode. In reality, both the magnitude and the direction of the angular difference N are not constant and the angular difference N is composed of a low frequency component and a high frequency component. For the purpose of suppressing the high frequency mode, a control torque is applied to suppress only the high frequency component.

Figure 5:
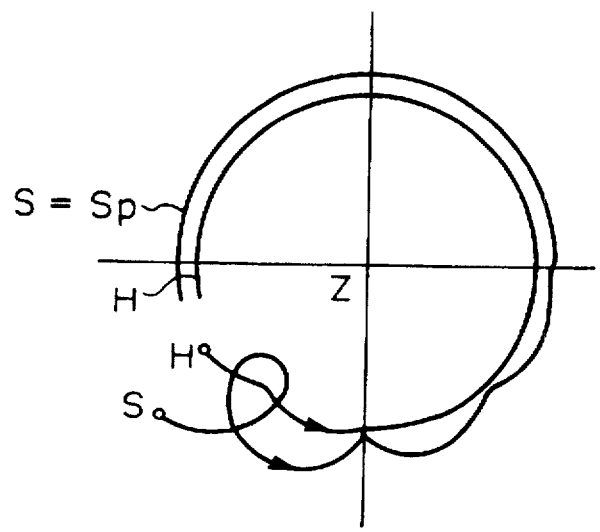
FIG. 5 illustrates a manner of the case in which only the nutation mode of a rotary member is suppressed.

For example, FIG. 5 illustrates an example in which the nutation (high frequency) mode alone is suppressed. It can be seen that the nutation mode has been eliminated, but since the rotary axis S and the angular momentum vector H do not align with each other, a slow conical motion continues with a certain constant gap kept therebetween. This is called as a steady precession motion and the rotary axis S now coincides with Sp. Similarly, a steady nutation motion consisting only of the high frequency mode is also available wherein, conversely with the case of low frequency mode, a large circle motion of the rotary axis S is provided outwardly of a small circle motion of the angular momentum vector H, both being a high speed conical motion (the view thereof being omitted).

A manner of concretely deciding the control torque u(k) will next be explained. Assume that the sampling period of digital control is T, and thus with k=0, 1, 2, . . . , the time t=kT is the moment of sampling. For example, in FIG. 6, at t=0, the inclined angle and the relevant velocity are sampled, and from the sampled values, the control torque u(1) to be generated during the period k=1 is decided before t=T. Namely, the control torque u(1) has to be calculated between the time 0<t<T. During the calculation, the control torque u(0) which has been previously decided is applied. The underlined symbols denote two-dimensional complex vectors on the complex plane shown in FIG. 2, and H-S=N. H and S designate the displacement of the unit tip ends respectively from Z axis.

As it is clear from FIG. 3, the direction of u(1) required for suppression of the low frequency mode is so decided that the straight line or vector 2 connected from the origin O cancels the free motion. The method of deciding such a direction will be explained. After the previous control using the control torque u(0) is finished at t=T, the direction of u(1) is selected as follows: It is assumed that the case of applying no control torque u(1) which means the axis is in the free motion with no torque, and the direction of the low frequency component in S at the time t=2T is estimated. The direction of the control torque u(1) is selected to cancel the assumed direction, or it is opposite to the assumed direction of the low frequency component in S at the time of t=2T.

Between the straight line or vector 2 and the torque $\underline{u}(1)$, there is an angular difference of $\lambda p \cdot T/2$ radian, where $\lambda p$ is the angular velocity of the low frequency mode as disclosed above.

Figure 4:
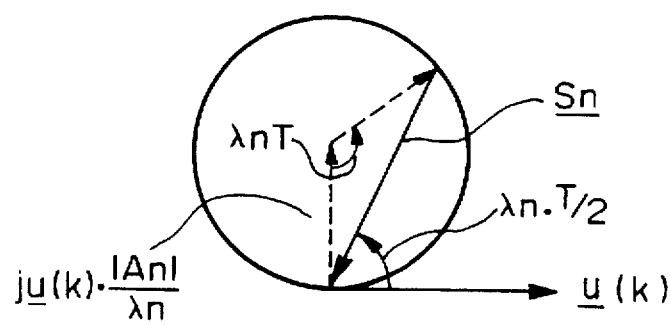
FIG. 4 illustrates vectors relating to only a high frequency (nutation) mode of a rotary member.

Similarly, in the suppression of the high frequency mode, the direction of the torque u(1) is also so selected as to cancel the high frequency component in S at the time of t=2T when no torque is assumed to be applied. It is also conceivable in such a case that the sampling period T is so prolonged that T is longer than that of the high frequency mode. Since the circle in FIG. 4 is rotated in the high frequency mode angular velocity, if T is equivalent to integer times of the high frequency mode period, the mode cannot be controlled. It is therefore advisable to select the sampling period in order that it is not naturally the integer times of the high frequency mode period or even the figure nearby.

The method of deciding the torque $\underline{u}(k)$ of the feedback control as explained above is then mathematically expressed as follows, where feedback gains of the low and high frequency modes are respectively Kp and Kn, and the assumed values of both modes when $\underline{u}(k)$ is not provided are $\underline{Bp}(K+1)$ and $\underline{Bn}(K+1)$ respectively:

$$\underline{u}(k) = -Kp\underline{Bp}(k+1)\lambda p \cdot \exp[-j\lambda pT/2]/(2\sin[\lambda pT/2]) \quad (1)$$
$$-kn\underline{Bn}(k+1)\lambda n \cdot \exp[-j\lambda nT/2]/(2\sin[\lambda nT/2])$$

As described above, $\lambda p$ and $\lambda n$ are the angular frequencies of the low and high frequency modes, respectively.

In the two radial axes in FIG. 2, or the X axis and Y axis, if the two axes components of a complex vector are expressed by the use of subscripts x, y, the vector $\underline{u}$ can be expressed as follows:

$$u = ux + juy \quad (2)$$

where j is an imaginary unit, or $j=\sqrt{-1}$

Further, the exponential function will be expressed as follows:

$$\exp[-jA] = \cos[A] - j\sin[A] \quad (3)$$

Accordingly, the real number part of Expression (1) represents the control amount of X axis component while the imaginary number part thereof represents the control amount of Y axis component.

Although the explanation of the method of calculating or assuming Bp, Bn has been omitted, any method may be used. In case that disturbances are foreseen, the assumed values may include the influences by those disturbances. In case that no disturbance is foreseen, it may be convenient to apply transition matrix of state variables.

The assumed values of Bp and Bn when there is no disturbance will be explained in detail. Assume that the rotary member 1 is axisymmetrical, the two radial axes passing through the center of gravity of the rotary member are x axis and y axis, and the moment of inertia around the x and y axes is I. Assuming that the inclined angle of the rotary axis S from the Z axis to X and Y axes (with reference to FIGS. 1 and 2) are set to $\theta x$ and $\theta y$, respectively, the inclined angles of the rotary axis S from the axis Z may be expressed as a position vector of unit length tip of S on the complex plane as follows:

$$\underline{S} = \theta y - j\theta x = -j\underline{\theta} \quad (4)$$

$$\underline{N} = [I \cdot d\theta x/dt + jI \cdot \theta y/dt]/Hs \quad (5)$$

Where Hs is the angular momentum of the rotary member 1 around the rotary axis S and obtained by multiplying a moment of inertia around the rotary axis S with a spin velocity.

When Hs/I is set to h, or h=Hs/I, Expression (5) is represented as follows:

$$\underline{N} = [d\theta x/dt + jd\theta y/dt]/h = d\underline{\theta}/dt/h \quad (6)$$

The equations of motion of the rotary member having a divergence spring constant K for the respective inclined angles $\theta x$ and $\theta y$ are represented by the following Equations (7) and (8):

$$Id^2\theta x/dt^2 + Hsd\theta y/dt - K\theta x = Ux(kT) \quad (7)$$

$$Id^2\theta y/dt^2 - Hsd\theta x/dt - K\theta y = Uy(kT) \quad (k=0, 1, 2, \ldots) \quad (8)$$

Multiplying both sides of Equation (8) with j and then adding the equation (7) thereto to express in terms of complex variables, the following equation is obtained.

$$Id^2\underline{\theta}/dt^2 - jHsd\underline{\theta}/dt - k\underline{\theta} = \underline{U}(kT) \quad (9)$$

By dividing both sides of Equation (9) with I, Equation (10) is obtained, provided that h=Hs/I, k=K/I (having no relation with k of sampling sequence), and $\underline{u} = \underline{U}/I$.

$$d^2\underline{\theta}/dt^2 - jhd\underline{\theta}/dt - k\underline{\theta} = \underline{u}(kT) \quad (k=1, 2, 3, \ldots) \quad (10)$$

A state variable x and an output y which is expressed by matrices as follows are introduced.

$$x = [\underline{\theta}, d\underline{\theta}/dt]^T \quad (11)$$

$$y = [\underline{S}, \underline{N}]^T \quad (12)$$

The symbol T at the upper right of Equations (11) and (12) denotes the transposition of the matrices.

A state equation and output equation which are usually applied are:

$$dx/dt = Ax + bu \quad (13)$$

$$y = Cx \quad (14)$$

Where, $$A = \begin{bmatrix} 0, & 1 \\ k, & jh \end{bmatrix} b = \begin{bmatrix} 0 \\ 1 \end{bmatrix} C = \begin{bmatrix} -j, & 0 \\ 0, & 1/h \end{bmatrix} \quad (15)$$

The following discrete system may be obtained by using a transition matrix $\Phi(t)$.

$$[\underline{S}(k+1), \underline{N}(k+1)]^T = \Phi(T)[\underline{S}(k), \underline{N}(k)]^T + \quad (16)$$

$$\int_0^T [-j\Phi_{12}(\eta), \Phi_{21}(\eta)/h]^T d\eta \underline{u}(k)$$

where, $$\Phi(t) = \begin{bmatrix} \Phi_{11}(t), & \Phi_{12}(t) \\ \Phi_{21}(t), & \Phi_{22}(t) \end{bmatrix} \quad (17)$$

$$\Phi_{11}(t) = ((\lambda n - h)\exp[j\lambda nt] + (h - \lambda p)\exp[j\lambda pt])/(\lambda n - \lambda p) \quad (18)$$

$$\Phi_{12}(t) = h[-\exp[j\lambda nt] + \exp[j\lambda pt]]/(\lambda n - \lambda p) \quad (19)$$

$$\Phi_{21}(t) = -k\Phi_{12}(t)/h^2 \quad (20)$$

$$\Phi_{22}(t) = (\lambda n \exp[j\lambda nt] - \lambda p \exp[j\lambda pt])/(\lambda n - \lambda p) \quad (21)$$

$$j\lambda n, j\lambda p = \text{eigenvalue of matrix } A = j[h \pm \sqrt{(h^2 - 4k)}]/2 \quad (22)$$

It is assumed the second term of the right side or the integral term of Equation (16) is expressed as follows:

$$q(T)\underline{u}(k)=[q_1 T q_2(T)]^T \underline{u}(k) \tag{23}$$

Then, the integrated result is substituted, the following Equations (24) and (25) are obtained.

$$q_1(T)=j((1-\exp[j\lambda_p T])/\lambda_p)-((1-\exp[j\lambda_n T])/\lambda_n))/(\lambda_n - \lambda_p) \tag{24}$$

$$q_2(T)=j(\exp[j\lambda_n T])/((\lambda_n - \lambda_p)h) \tag{25}$$

As a consequence, the discrete time system of the output y(t) is represented as follows;

$$y(k+1)=\Phi(T)y(k)+q(T)\underline{u}(k) \tag{26}$$

Figure 6:
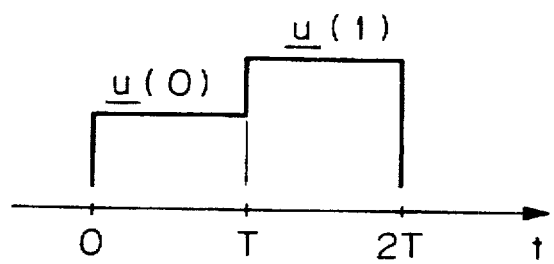
FIG. 6 illustrates the relationship between the control torque u(k) and sampling times and periods.

Obtaining the free motion y(2T+t) after an unknown torque u(1) is applied, with reference to FIG. 6, provided that $\underline{u}(2)=0$, the free motion is expressed as follows provided that t is the time after 2T, or k=2;

$$y(2T+t)=\Phi(t)\{\Phi(T)y(1)+[q_1(T)q_2(T)]^T \underline{u}(1)\} \tag{27}$$

When k=0, Equation (26) becomes as follows;

$$y(1)=\Phi(T)y(0)+q(T)\underline{u}(0) \tag{28}$$

Accordingly, since y(0) is a real detected information which can be actually used, y(1) represented by Equation (28) can be obtained based on the calculation and is an assumed value, and thus y(2T+t) can be analytically obtained using Equation (27).

As only S(2T+t) is required from Equation (27), the following form is obtained.

$$\underline{S}(2T+t)=\underline{S_n}\exp[j\lambda_n t]+\underline{S_p}\exp[j\lambda_p t] \tag{29}$$

Wherein $\underline{S_n}$ and $\underline{S_p}$ are the functions of y(1) and u(1) and can be expressed as follows;

$$\underline{S_n}=[\lambda_p \underline{S}(1)+h\underline{N}(1)+j(\underline{u}(1)/\lambda_n)(1-\exp[j\lambda_n T])]/(\lambda_p - \lambda_n) \tag{30}$$

$$\underline{S_p}=[\lambda_n \underline{S}(1)+h\underline{N}(1)+j(\underline{u}(1)/\lambda_p)(1-\exp[j\lambda_p T])]/(\lambda_n - \lambda_p) \tag{31}$$

Since Equations (30) and (31) take the same form, if they are represented by one form, then $$\underline{S_c}=Ac(\underline{Bc}(1)+j\underline{u}(1)(1-\exp[j\lambda c T])/\lambda c) \tag{32}$$

Where c=n or p, Ac is a constant, and $\underline{Bc}(1)$ is the assumed value determined by y(1) and an eigenvalue of angular velocity. Namely, $$An=1/(\lambda_p - \lambda_n), Ap=1/(\lambda_n - \lambda_p) \tag{32a}$$

$$\underline{Bc}(1)=\lambda c \underline{S}(1)+h\underline{N}(1) \tag{32b}$$

The term including $\underline{u}(1)$ in Equation (32) corresponds to the straight line or vector 2 or 3 in FIG. 3 or 4 and the radius of the circle is u(k)|Ac1|λc.

It is to be noted again that the purpose of the control is to decrease Sc. For this purpose, it is ideal to decide $\underline{u}(1)$ as $\underline{uc}(1)$ in a manner to make Equation (32) to be zero. Namely, $$\underline{Bc}(1)+\underline{uc}(1)2\sin[\lambda c T/2]\exp[j\lambda c T/2]/\lambda c=0 \tag{33}$$

Accordingly, $$\underline{uc}(1)=-\underline{Bc}(1)\lambda c \exp[-j\lambda c T/2]/2\sin[\lambda c T/2] \tag{34}$$

Equation (1) provided k=1 can be attained by multiplying Equation (34) with the feedback gain Kc (c=n or p) and summing them of the low and high frequency modes. Since $\underline{Bc}(1)$ has been obtained form $\underline{S}(k+1)$ with t=0 in Equation (29), $\underline{Bc}(K+1)$ has been employed in Equation (1).

The denominator $2 \cdot \sin[\lambda c T/2]$ in Equation (34) is an extremely efficient factor. This is, since the sampling period T have to be sometimes changed depending on the rotational speed of the rotary member and in this case if there is no need to modify the gain by the denominator, the feedback amount or the cord length will be varied by T or the stability will be varied. However, since the feedback amount corresponds to the diameter of the circle in FIG. 3 or 4 owing to the denominator, no influence will be caused by T. Besides, even if T exceeds the mode period, the symbol (+) or (−) will be automatically altered, thus much convenience being able to be derived.

Since one of the eigenfrequencies λn and λp (represented by λc) is increased and the other is decreased in accordance with a rotational speed, if it is multiplied, the radius of circles will not be influenced from the rotational speed. In practice, however, the following simulation has revealed that it is safer to consider not the diameter but the radius so that the control will not be excessive in consideration of the possibility of the control torques of the low and high frequency modes being coincided with each other.

Examples of Simulation

Several simulations have been conducted as follows by using concrete examples. Small circles along the locus of H shown in FIGS. 7–11 indicate the respective instances of sampling.

The conditions of the simulations are as follows.

Spin Velocity=2000[rad/s]=19,198[rpm]

λp (angular frequency of the low frequency mode) =88.2 [rad/s]

Tp(period of the low frequency mode)=71[ms]

λn(angular frequency of the high frequency mode) =918 [rad/s]

Tn(period of the high frequency mode)=6.84[ms]

Figure 7:
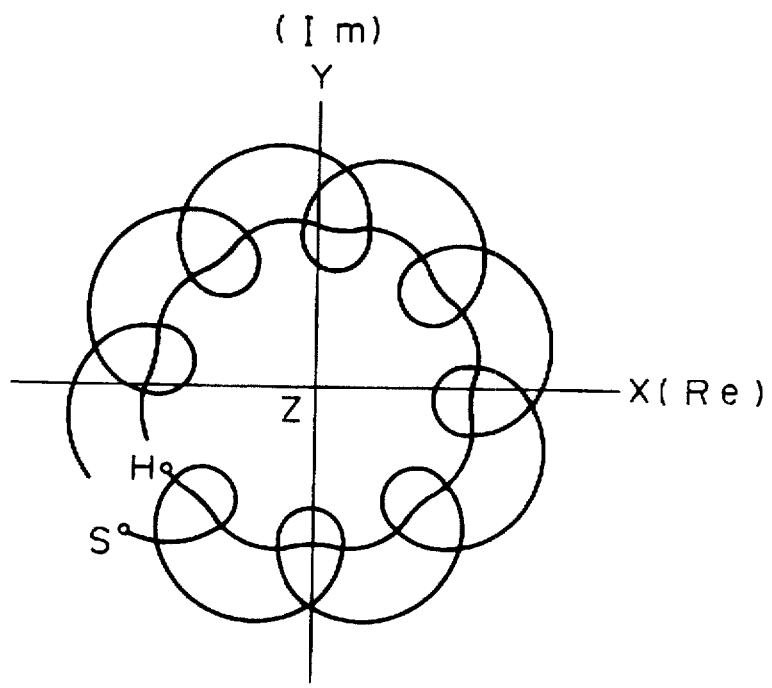
FIG. 7 illustrates an example of a simulation result regarding the tripping motion and the angular momentum vector motion of a rotary member without being controlled.

FIG. 7 shows the case of no control. As shown therein, neither divergence nor convergence have been caused because of no control.

Figure 8:
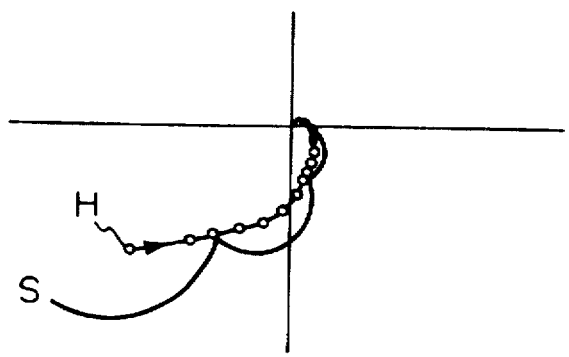
FIG. 8 illustrates an example of a concrete simulation result according to the present invention.

FIG. 8 illustrates the case where the sampling period T=1.5[ms]=0.22·Tn, by which a rapid convergence has been apparently obtained.

Figure 9:
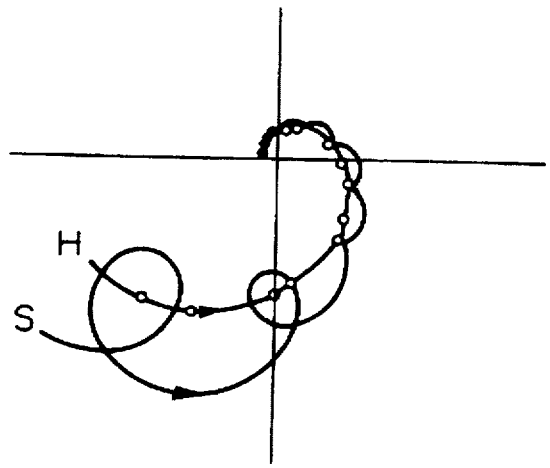
FIG. 9 illustrates a second example of a concrete simulation result according to the present invention.
Figure 10:
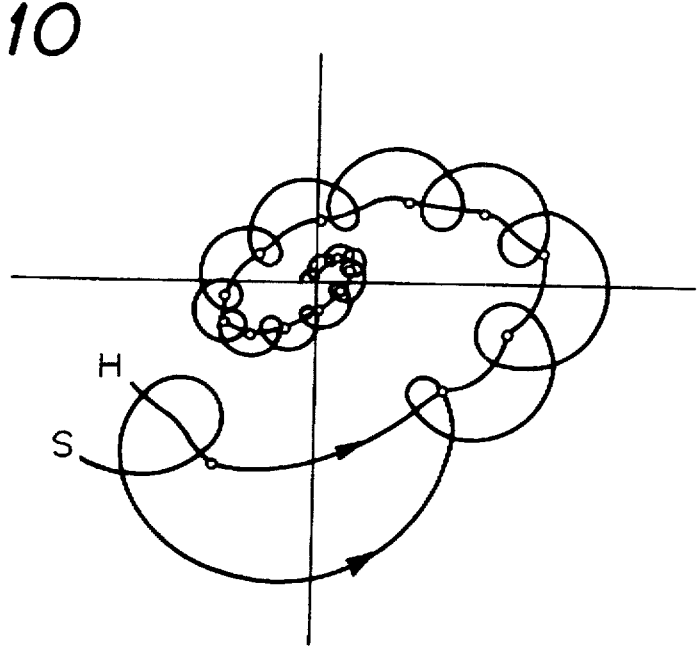
FIG. 10 illustrates a third example of a concrete simulation result according to the present invention.

FIGS. 9 and 10 show the cases where the sampling period T=3.42[ms]=0.5·Tn and T=6.2[ms]=0.9·Tn, respectively, from which it is obvious the number of control is decreased and so the convergence effect is lowered, as the sampling period is increased.

Figure 11:
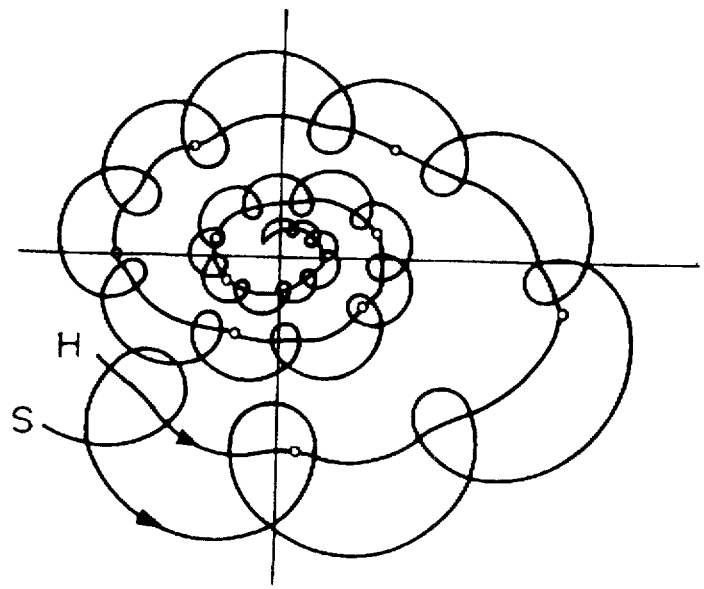
FIG. 11 illustrates a fourth example of a concrete simulation result according to the present invention.

FIG. 11 shows the case where the sampling period T=12.4 [ms]=1.81·Tn. In this case, although the sampling period was rather large, a considerably effective convergence could be obtained.

Figure 12:
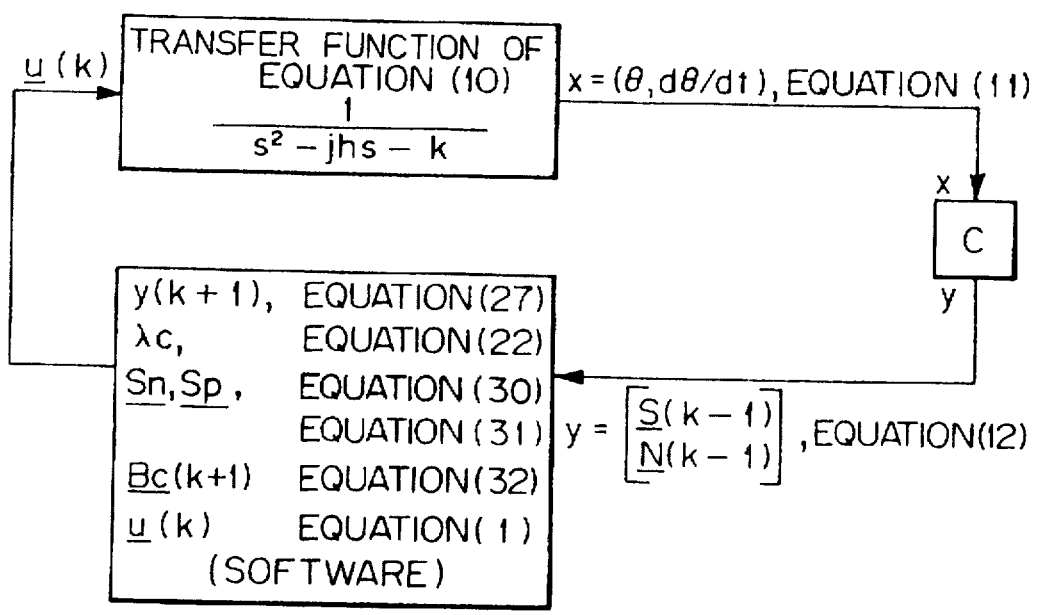
FIG. 12 shows the whole control system and a relational expression for deciding the control torque u(k), according to the present invention.

FIG. 12 illustrates the whole control system and the related equations practiced therein.

As explained above, even if the sampling period is longer than the period of the high frequency mode of the object rotational member, a stabilization or convergence of the axis motion can be achieved, while no prior art is capable of achieving it. In almost all the prior control method in this technical field, the PID control using an analog control has been employed. Although some prior arts has utilized a digital control method, only when the sampling period was shorter than the period of the high frequency mode, the convergence could be obtained. Accordingly, the digital control method of the prior art was difficult to apply to turbo molecular pumps. In the present invention, although it is necessary to know the tilting velocity, it is possible to control the tilting angle of the axis even if the sampling period is longer than the high frequency mode period, and thus an observer which requires a long computation time period can now be used during the sampling period.

However, it is preferable to make the sampling period to be shorter, in order to derive a better result. That is because, when the sampling period is longer, the number of control during a predetermined unit time period will be reduced, thereby the convergence effect will be lowered.

In order to improve the low convergence effect when the sampling period is longer, a low pass filter (LPF) directly connected to an output of an angular sensor can be adopted. In the case of using the LPF, an output of the LPF can be easily sampled and the cost of the system may be lowered. After the sampling, a rotational vector of the low frequency mode is calculated from the sampled output, using a software. In case of that a first-order lag circuit is utilized as the LPF, it can be said from the simulation results that the time constant is preferred to be close to the period of the nutation mode but that conversion may be sufficiently achieved even if it is several times or several fractions of that value.

Figure 13:
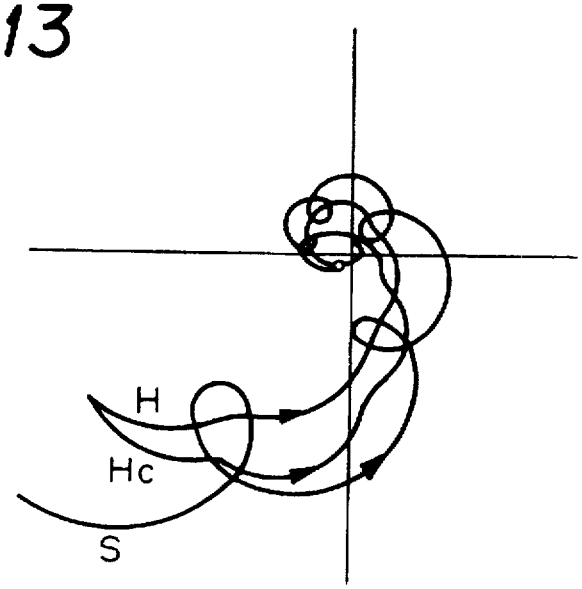
FIG. 13 illustrates a fifth example of a simulation result which is compensated in respect of phase according to the present invention.

FIG. 13 illustrates an example in which the output of the LPF is compensated by the following method in respect of the phase lag and the angular momentum vector H is estimated from the compensated value to be He. More specifically an signal of the inclined angle sensor is passed through the LPF a time constant of which is equal to Tn to attenuate the high frequency mode component of the inclined motion. And the phase delay of the remaining low frequency mode component by the LPF is compensated by rotating the radius vector geometrically by the phase lag angle with the low frequency mode component as the circular motion of the conical motion, and the compensated low frequency mode component is multiplied with $1/[1+(K/h^2)]$, the result of which is taken as He. This relation can be understood from the fact that the dotted line Sp in FIG. 2, if it is a little bit contracted, is similar to the real H. Since $\underline{N}$ can be assumed from $\underline{H}$-$\underline{S}$=$\underline{N}$, d$\theta$/dt can also be estimated from Equation (6).

In the examples shown in the drawings up to FIG. 11, the inclined angular velocity d$\theta$/dt is assumed as to be already known. In the example shown in FIG. 13, the same relational expression as those used in the previous examples are used except that the estimated values as above described are used. Since in the example in FIG. 13 where the sampling period T=1.36Tn, the conversion proceeds more quickly, deviation of He from the true angular momentum vector H is correspondingly more outstanding. However, this conversion is acceptable.

Figure 14:
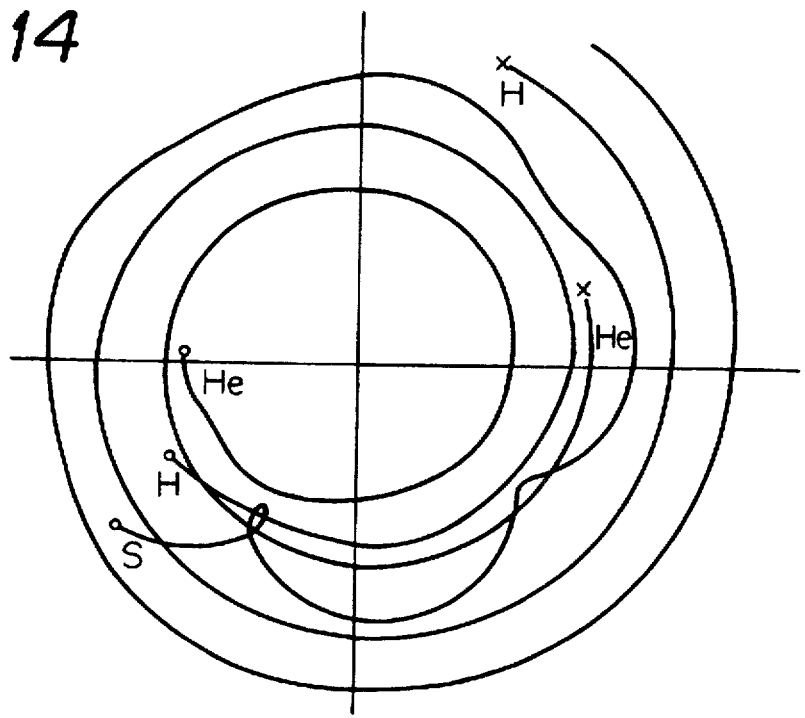
FIG. 14 illustrates an example of a simulation result without phase compensation.

FIG. 14 illustrates an example in which the phase compensation has not been executed. The high frequency mode has been suppressed, while the low frequency mode has been diverged. The estimated He is considerably different in phase and magnitude from H, at the initial stage (indicated by small circle) and the last stage (indicated by x).

If the transfer function of LPF is 1/(1+$\tau$s), in order to compensate only the phase in the mode frequency $\lambda$, the inclined angular signal $\underline{S}$=Sx+jSy is multiplied with the following complex gain $(i+j\tau\lambda)/\sqrt{1+(\tau\lambda)^2}$, and the real part of the result corresponds to X axis while the imaginary part thereof corresponds to Y axis.

Figure 15A:
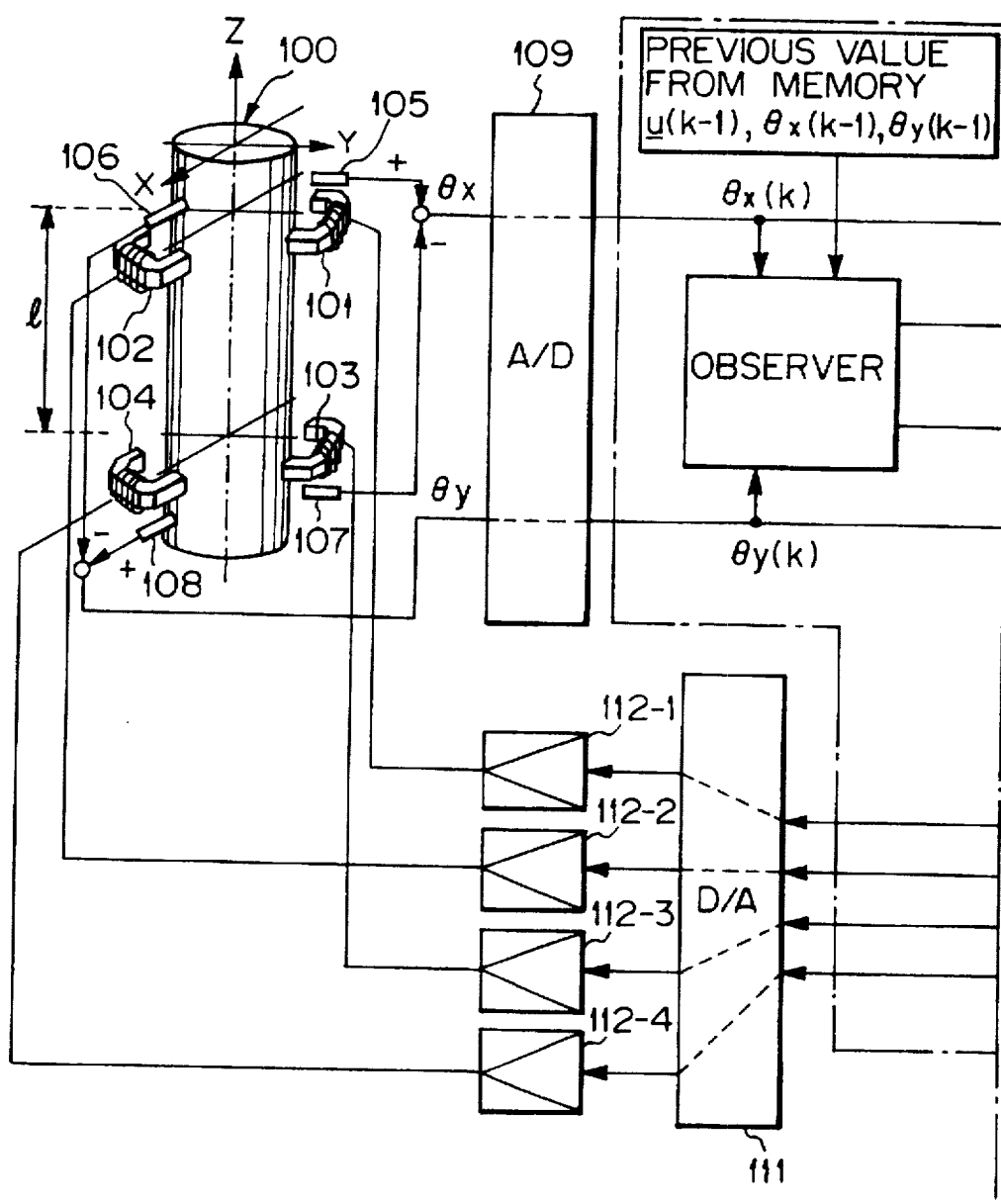
FIG. 15A and FIG. 15B shows a constitution of a control apparatus which embodies a digital control method, according to the present invention; and FIG. 16A
Figure 15B:
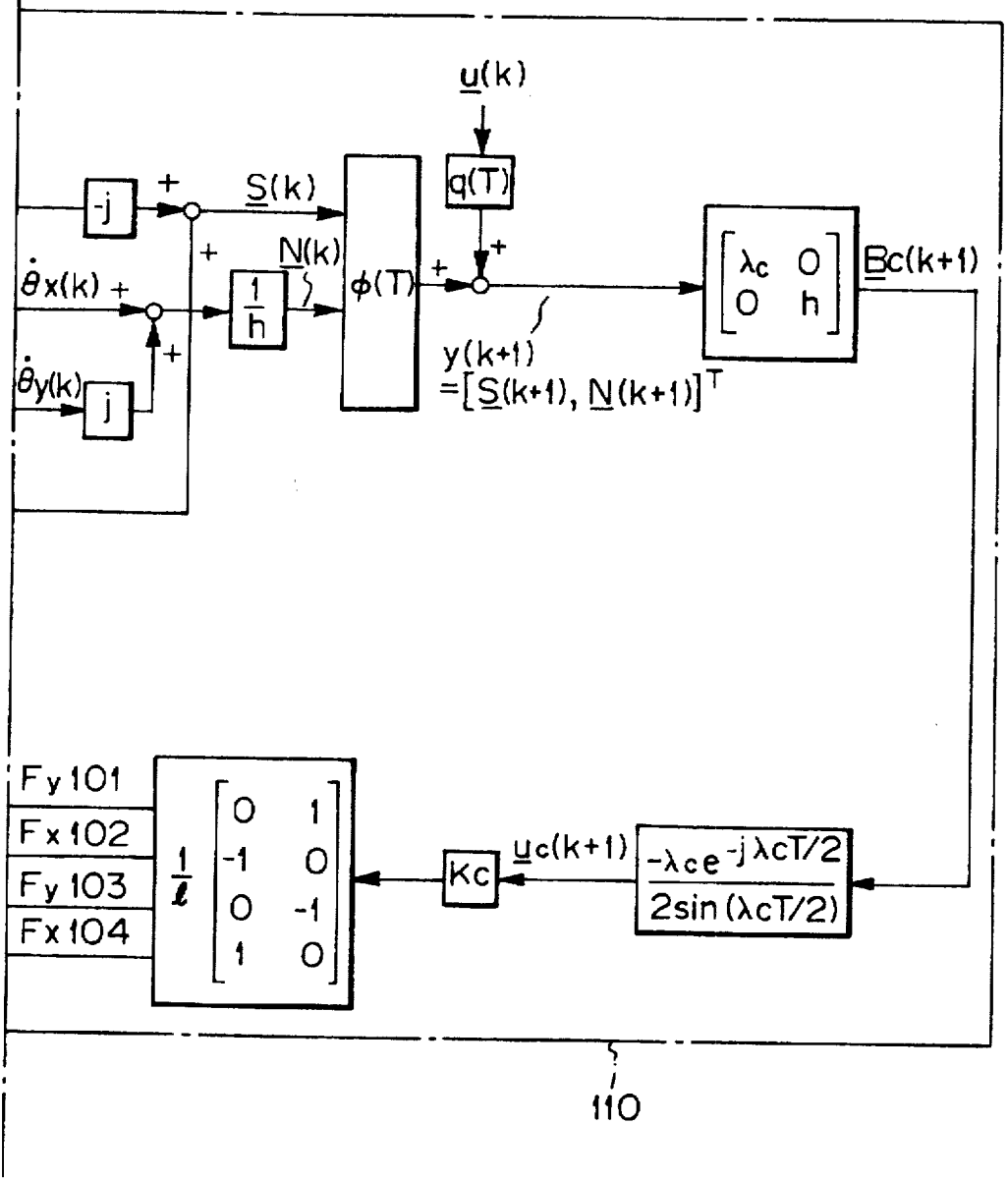

FIG. 15 illustrates a constitution of the control apparatus which embodies digital control method. In FIG. 15, the numeral 100 designates a rotary member supported by a magnetic bearing, 101 and 102 electromagnets constituting the magnetic bearing, and 103, 104 electromagnets also constituting the magnetic bearing, wherein the electromagnets 101, 102 is provided at the upper part of the rotary member 100 and the electromagnets 103, 104 is provided at the lower part thereof. It is to be understood that there are provided electromagnets having the same characteristics at the opposite coordinate sides but they are omitted from the drawings for clarity. The electromagnets 101, 103 serve to support the rotary member 100 in the Y direction while the electromagnets 102, 104 support the same in the X direction. The distance between the electromagnets 101, 102 and the electromagnets 103, 104 is l.

Numeral 105 designates a displacement sensor adapted to detect the displacement of the upper part of the rotary member 100 in the Y direction, 106 the displacement sensor adapted to detect the displacement of the upper part of the rotary member in the X direction, 107 the displacement sensor adapted to detect the displacement of the lower part of the rotary member 100 in the Y direction and 108 the displacement sensor adapted to detect the displacement of the lower part of the rotary member in the X direction.

A control section is consisted of an A/D (Analog/Digital) convertor 109, a digital signal processing section 110, a D/A (Digital/Analog) convertor 111, and power amplifiers 112-1, 112-2, 112-3, 112-4.

The digital signal processing section 110 receives the output signal $\theta$x(k) and the output signal $\theta$y(k) which have been obtained by converting the deviation signal $\theta$x between output signals from the displacement sensors 105 and 107 and the deviation signal $\theta$y between output signals from the displacement sensor 106 and 108 into digital signals by the A/D convertor 109, respectively. It executes various sorts of operations as illustrated in blocks of FIG. 15, acquires digital output signals $Fy_{101}$, $Fx_{102}$, $Fy_{103}$, $Fx_{104}$, which in turn are converted to analog signals by the D/A convertor 111. The analog signals are then provided to the electromagnets 101, 102, 103, 104 by way of the power amplifiers 112-1, 112-2, 112-3 and 112-4.

Figure 16A:
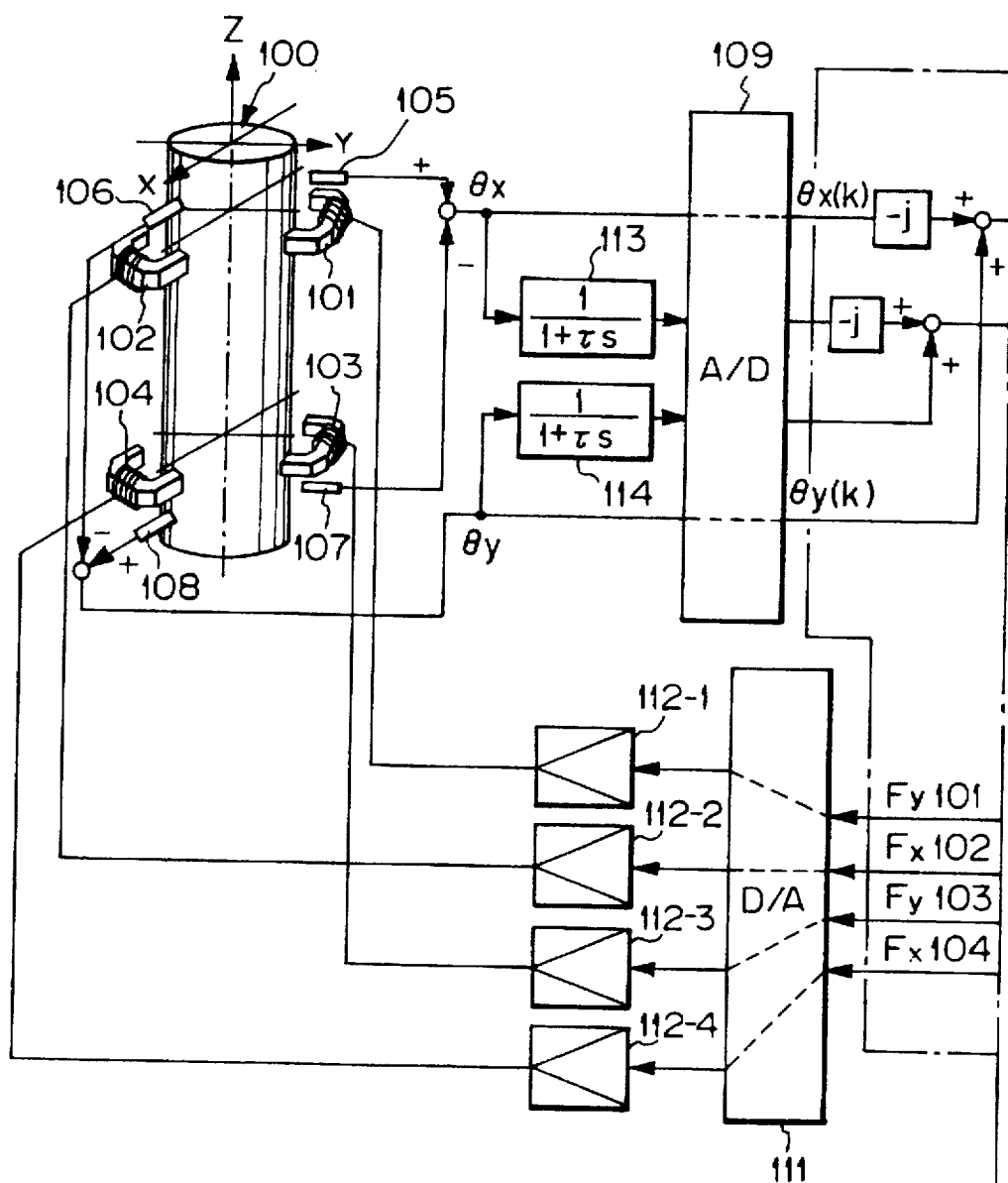
FIG. 16B illustrates another constitution of a control apparatus which embodies a digital control method, according to the present invention.
Figure 16B:
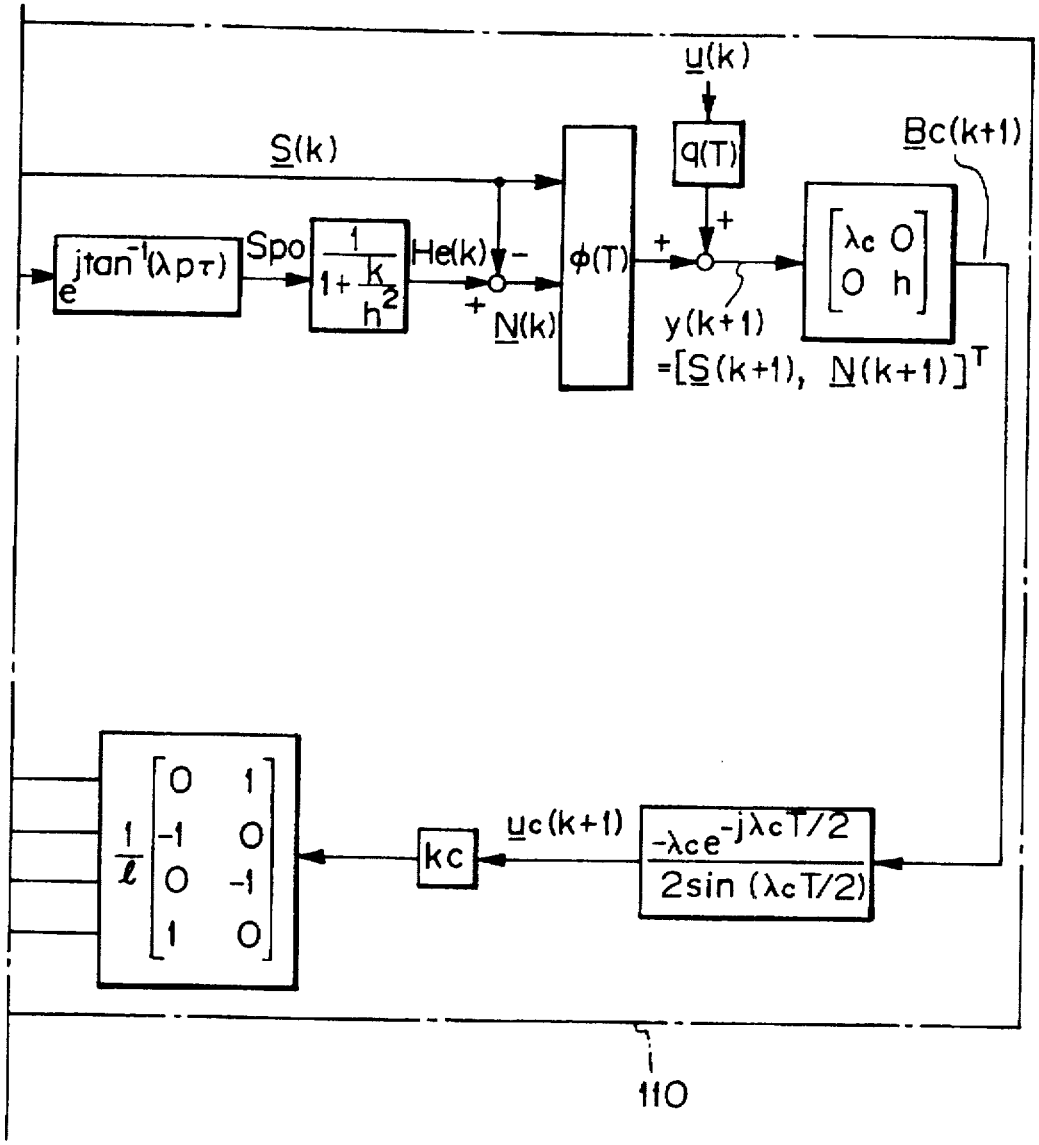

FIG. 16 illustrates another constitution of the control apparatus which embodies a digital control method. The difference between the control apparatuses shown in FIGS. 15 and 16 is that low pass filters (LPF) 113, 114 are provided and the deviation signal $\theta$x and the deviation signal $\theta$y are input to the A/D convertor 109 after having attenuated the high frequency mode component through the low pass filters 113, 114 in the latter. Further, in the latter, the observer is unnecessary. The remaining constitution is similar to that of the control unit shown in FIG. 15.

According to the present invention as explained above, a sufficiently stable control is made available even if the sampling period is long.

While the invention has been particularly shown and described with reference to preferred embodiments thereof, it will be understood by those skilled in the art that the forgoing and other changes in form and details can be made therein without departing from the spirit and scope of the invention.

What is claimed is:

1. A method of digitally controlling the axis of an axisymmetry rotary member supported by magnetic bearings, comprising the steps of:

(a) sampling an inclined angle and a rate of the inclined angle of said rotary member;

(b) in response to the sampled inclined angle and the rate, analytically determining an assumed inclined angle motion of said rotary member at or around an end of each sampling period when no control torque is applied to said axis of said rotary member during the sampling period;

(c) dividing said assumed inclined angle motion into a plurality of mode components;

(d) determining rotational vectors of the divided mode components in a free conical motion;

(e) determining rotational vectors of the divided mode components in a forced conical motion at the end of the sampling period, provided that an unknown control torque having a constant direction and constant magnitude is virtually applied to said axis during one sampling period, but no free conical motion exists;

(f) adding said rotational vectors in the free and forced conical motions for each of mode components;

(g) determining the direction and magnitude of said unknown control torque for each of mode components so as to reduce the rotational vectors of the free conical motion even when the sampling period exceeds a period of one of the mode components; and (h) applying each of the determined control torques or the added control torque to said axis by control coils.

2. A method according to claim 1, wherein said plurality of mode components are a low frequency mode component and a high frequency mode component of a rigid mode.

3. A method according to claim 1, wherein said determined control torque for each mode component includes a feedback gain multiplied by $\lambda$ or $1/\sin/(\lambda \cdot T/2)$ or the product thereof, where T is the sampling period and $\lambda$ is a mode angular frequency of the free conical motion.

4. A method according to claim 2, wherein said determined control torque for each of said low and high mode components includes a feedback gain multiplied by $\lambda$ or $1/\sin(\lambda \cdot T/2)$ or the product thereof, where T is the sampling period and $\lambda$ is a mode angular frequency of the free conical motion.

5. A method of digitally controlling an axis of an axissymmetry rotary member supported by magnetic bearings, comprising the steps of:

(a) measuring an inclined angle of said rotary member by an inclined angle sensor;

(b) filtering an inclined angle signal from said inclined angle sensor by a low pass filter to pass only a low frequency mode component therethrough;

(c) sampling said low frequency mode component;

(d) compensating the sampled low frequency mode component in phase by geometrically rotating the radius vector of the low frequency mode component by a delayed phase which is caused due to passing through said low pass filter;

(e) subtracting the sampled and compensated low frequency mode component from the inclined angle signal to obtain a high frequency mode component, thereby the low and high frequency mode components being in a free conical motion at each sampling time;

(f) determining rotational vectors of the low and high frequency mode components in the free conical motion;

(g) determining rotational vectors of the low and high frequency mode components in a forced conical motion at the end of the sampling period, provided that an unknown control torque having a constant direction and constant magnitude is virtually applied to said axis during the sampling period, but no free conical motion exists;

(h) adding said rotational vectors in the free and forced conical motions for each of the low and high frequency mode components;

(i) determining the direction and magnitude of said unknown control torque for each of the low and high frequency mode components so as to reduce the rotational vectors of the free conical motion even when the sampling period exceeds a period of one of the mode components; and (j) applying each of the determined control torques or the added control torque to said axis by control coils.

6. A method according to claim 5, wherein said determined control torque for each of said low and high mode components includes a feedback gain multiplied by $\lambda$ or $1/\sin(\lambda \cdot T/2)$ or the product thereof, where T is the sampling period and $\lambda$ is a mode angular frequency of the free conical motion.

7. A system for digitally controlling an axis of an axisymmetry rotary member supported by magnetic bearings, comprising:

(a) sampling means for sampling an inclined angle and a rate of the inclined angle of said rotary member;

(b) means, in response to said inclined angle and the rate, for analytically determining an assumed inclined angle motion of said rotary member at or around the end of each sampling period when no control torque is applied to said axis of said rotary member during the sampling period;

(c) means for dividing said assumed inclined angle motion into a plurality of mode components;

(d) means for determining rotational vectors in a free conical motion of the divided mode components;

(e) means for determining rotational vectors of the divided mode components in a forced conical motion at the end of the sampling period, provided that an unknown control torque having a constant direction and constant magnitude is virtually applied to said axis during the sampling period, but no free conical motion exists;

(f) means for adding said rotational vectors in the free and forced conical motions for each mode component;

(g) means for determining the direction and magnitude of said unknown control torque for each of mode components so as to reduce the rotational vectors of the free conical motion even when the sampling period exceeds a period of one of the mode components; and (h) means for applying each of the determined control torques or the added control torque to said axis by control coils.

8. A system according to claim 7, said plurality of mode components are a low frequency mode component and a high frequency mode component of a rigid mode.

9. A system according to claim 7, wherein said determined control torque for each mode component includes a feedback gain multiplied by $\lambda$ or $1/\sin(\lambda \cdot T/2)$ or the product thereof, where T is the sampling period and $\lambda$ is a mode angular frequency of the free conical motion.

10. A system according to claim 8, wherein said determined control torque for each of the low and high frequency mode component includes a feedback gain multiplied by $\lambda$ or $1/\sin(\lambda \cdot T/2)$ or the product thereof, where T is the sampling period and $\lambda$ is a mode angular frequency of the free conical motion.

11. A system of digitally controlling an axis of an axissymmetry rotary member supported by magnetic bearings, comprising:

(a) an angle sensor for measuring an inclined angle of said rotary member;

(b) a low pass filter for passing only a low frequency mode component in an inclined angle signal output from said inclined angle sensor;

(c) means for sampling said low frequency mode component;

(d) means for compensating the sampled low frequency mode component in phase by geometrically rotating the radius vector of the low frequency mode component by a delayed phase which is caused due to passing through said low pass filter;

(e) means for subtracting the sampled and compensated low frequency mode component from the sampled inclined angle signal to obtain a high frequency mode component, thereby the low and high frequency mode components being in a free conical motion at each sampling time;

(f) means for determining rotational vectors in the free conical motion of the low and high frequency mode components;

(g) means for determining rotational vectors in a forced conical motion of low and high frequency mode components at the end of the sampling period, provided that an unknown control torque having a constant direction and constant magnitude is virtually applied to said axis during one sampling period, but no free conical motion exists;

(h) means for adding said rotational vectors in the free and forced conical motions for each of the low and high frequency mode components;

(i) means for determining the direction and magnitude of said unknown control torque for each of the low and high frequency mode components so as to reduce the rotational vectors of the free conical motion even when the sampling period exceeds a period of one of the mode components; and (j) control coils for applying each of the determined control torques or the added control torque to said axis.

12. A system according to claim 11, wherein said determined control torque for each of said low and high mode components includes a feedback gain multiplied by $\lambda$ or $1/\sin(\lambda \cdot T/2)$ or the product thereof, where T is the sampling period and $\lambda$ is a mode angular frequency of the free conical motion.

13. A method of digitally controlling the axis of an axisymmetry rotary member supported by magnetic bearings, comprising:

identifying rotational vectors of mode components in a free conical motion for a sampling period; and determining a control torque for each of the mode components so as to achieve convergence of axis motion of the rotary member by reducing the rotational vectors in the free conical motion even when the sampling period exceeds a period of one of the mode components.

14. A system for digitally controlling the axis of an axisymmetry rotary member supported by magnetic bearings, comprising:

means for identifying rotational vectors of mode components in a free conical motion for a sampling period; and means for determining a control torque for each of the mode components so as to achieve convergence of axis motion of the rotary member by reducing the rotational vectors in the free conical motion even when the sampling period exceeds a period of one of the mode components.

* * * * *